US006993816B2

(12) United States Patent
Greenhill

(10) Patent No.: US 6,993,816 B2
(45) Date of Patent: Feb. 7, 2006

(54) RETAINING RING INSTALLATION TOOL

(75) Inventor: Michael Greenhill, Highland Park, IL (US)

(73) Assignee: Smalley Steel Ring Company, Lake Zurich, IL (US)

( * ) Notice: Subject to any disclaimer, the term of this patent is extended or adjusted under 35 U.S.C. 154(b) by 24 days.

(21) Appl. No.: 10/738,470

(22) Filed: Dec. 17, 2003

(65) Prior Publication Data

US 2005/0132552 A1 Jun. 23, 2005

(51) Int. Cl.
*B23P 19/04* (2006.01)

(52) U.S. Cl. .......................................... 29/229; 29/255

(58) Field of Classification Search .................. 29/229, 29/255, 244, 263, 282, 280
See application file for complete search history.

(56) References Cited

U.S. PATENT DOCUMENTS 892,287 A 6/1908 Morse
1,363,522 A 12/1920 Leitch
1,430,702 A 10/1922 Troutman
1,506,767 A 9/1924 McLeod
2,422,549 A 6/1947 Hogin
2,657,818 A 11/1953 Mueller
2,961,755 A 11/1960 Prince
2,968,864 A 1/1961 Lee
3,030,700 A 4/1962 Jensen
3,158,923 A * 12/1964 Reinsma .................. 29/898.11
3,347,083 A 10/1967 Turpin et al.
3,581,379 A 6/1971 Drobilits
3,605,239 A 9/1971 Eschholz
4,203,191 A 5/1980 Gibson, Sr.
4,212,096 A 7/1980 Saito et al.
4,610,834 A 9/1986 Baron et al.
4,703,548 A 11/1987 Kumeth
4,724,608 A * 2/1988 Parrott ........................ 29/724
4,953,276 A 9/1990 Kusmer et al.
5,387,389 A * 2/1995 Catalanotti et al. ......... 264/318
D356,320 S 3/1995 Catalanotti et al.
5,540,582 A 7/1996 Catalanotti et al.
6,722,011 B1 * 4/2004 Bacon ......................... 29/451

OTHER PUBLICATIONS

"Roehr CAV-XP 2000 Expandable Cavity System", Cutting Technology, Jul./Aug. 2002, pp. 1-9.

* cited by examiner

*Primary Examiner*—Lee D. Wilson

(57) ABSTRACT

A retaining ring installation tool for use in installing retaining rings onto shafts and into bores is formed from a single piece of metal to define a cylindrical, elongated body. A hollow cavity is formed in one end of the body and the wall of the body that defines the cavity is slotted to form a plurality of individual, flexible spring contact arms or fingers which extend forwardly from a rear body portion and which collectively define an insertion end of the tool. The ends of the fingers are enlarged to ensure contact occurs between the tool and the retaining ring during the installation of the ring onto a shaft or into a bore. The contact arms are bent either radially inwardly or outwardly so that they will contact the retaining ring at all times during installation of the ring.

20 Claims, 5 Drawing Sheets

A
$D_1$
DS
DR
W
20
21
22
23
25
26
27
29
30
32
34
35

| Smalley P/N | | Catalog Free I.D. | Tolerance | Shaft Dia | Taper | Nom X | Max X | Measured Free I.D. | Avg Load |
|---|---|---|---|---|---|---|---|---|---|
| VS | 50 | 0.467 | +.000/-.01: | 0.500 | 5 | 0.189 | 0.263 | 0.458 | 9 |
| WS | 50 | 0.467 | +.000/-.01: | 0.500 | 5 | 0.189 | 0.263 | 0.461 | 11 |
| WST | 50 | 0.469 | +.000/-.01: | 0.500 | 5 | 0.177 | 0.251 | 0.467 | 14 |
| WSM | 50 | 0.464 | +.000/-.01: | 0.500 | 5 | 0.206 | 0.280 | 0.457 | 18 |
| VS | 75 | 0.715 | +.000/-.01: | 0.750 | 5 | 0.200 | 0.274 | 0.707 | 8 |
| WS | 75 | 0.710 | +.000/-.01: | 0.750 | 5 | 0.229 | 0.303 | 0.701 | 16 |
| WST | 75 | 0.708 | +.000/-.01: | 0.750 | 5 | 0.240 | 0.314 | 0.697 | 24 |
| WSM | 75 | 0.698 | +.000/-.01: | 0.750 | 5 | 0.297 | 0.371 | 0.687 | 34 |
| VS | 100 | 0.949 | +.000/-.01: | 1.000 | 5 | 0.291 | 0.366 | 0.944 | 8 |
| WS | 100 | 0.946 | +.000/-.01: | 1.000 | 5 | 0.309 | 0.383 | 0.941 | 16 |
| WST | 100 | 0.947 | +.000/-.01: | 1.000 | 5 | 0.303 | 0.377 | 0.939 | 20 |
| WSM | 100 | 0.932 | +.000/-.01: | 1.000 | 5 | 0.389 | 0.463 | 0.920 | 30 |
| VS | 150 | 1.442 | +.000/-.01: | 1.500 | 5 | 0.331 | 0.417 | 1.435 | 7 |
| WS | 150 | 1.433 | +.000/-.01: | 1.500 | 5 | 0.383 | 0.469 | 1.429 | 17 |
| WST | 150 | 1.419 | +.000/-.01: | 1.500 | 5 | 0.463 | 0.549 | 1.412 | 27 |
| WSM | 150 | 1.390 | +.000/-.01: | 1.500 | 5 | 0.629 | 0.703 | 1.385 | 46 |

Axial Load Required for Ring Installation Using 5°Taper (Bore)

| Smalley | P/N | Catalog Free O.D. | Tolerance | Bore Dia | Taper | Nom X | Max X | Measured Free O.D | Avg Load |
|---|---|---|---|---|---|---|---|---|---|
| VH | 50 | 0.531 | +.013/-.000 | 0.500 | 5 | 0.177 | 0.103 | 0.535 | 8 |
| WH | 50 | 0.532 | +.013/-.000 | 0.500 | 5 | 0.183 | 0.257 | 0.538 | 9 |
| WHT | 50 | 0.529 | +.013/-.000 | 0.500 | 5 | 0.166 | 0.240 | 0.534 | 12 |
| WHM | 50 | 0.538 | +.013/-.000 | 0.500 | 5 | 0.217 | 0.291 | 0.543 | 16 |
| VH | 75 | 0.783 | +.013/-.000 | 0.750 | 5 | 0.189 | 0.263 | 0.787 | 5 |
| WH | 75 | 0.790 | +.013/-.000 | 0.750 | 5 | 0.229 | 0.303 | 0.790 | 14 |
| WHT | 75 | 0.796 | +.013/-.000 | 0.750 | 5 | 0.263 | 0.337 | 0.802 | 20 |
| WHM | 75 | 0.807 | +.013/-.000 | 0.750 | 5 | 0.326 | 0.400 | 0.817 | 32 |
| VH | 100 | 1.052 | +.013/-.000 | 1.000 | 5 | 0.297 | 0.371 | 1.054 | 8 |
| WH | 100 | 1.054 | +.013/-.000 | 1.000 | 5 | 0.309 | 0.383 | 1.057 | 22 |
| WHT | 100 | 1.063 | +.013/-.000 | 1.000 | 5 | 0.360 | 0.434 | 1.066 | 38 |
| WHM | 100 | 1.080 | +.013/-.000 | 1.000 | 5 | 0.457 | 0.531 | 1.083 | 44 |
| VH | 150 | 1.559 | +.015/-.000 | 1.500 | 5 | 0.337 | 0.423 | 1.562 | 8 |
| WH | 150 | 1.567 | +.015/-.000 | 1.500 | 5 | 0.383 | 0.469 | 1.572 | 18 |
| WHT | 150 | 1.591 | +.015/-.000 | 1.500 | 5 | 0.520 | 0.606 | 1.596 | 30 |
| WHM | 150 | 1.605 | +.013/-.000 | 1.500 | 5 | 0.600 | 0.674 | 1.612 | 44 |

Installation Load for Housing Rings

RETAINING RING INSTALLATION TOOL

BACKGROUND OF THE INVENTION

The present invention relates generally to metal retaining rings, and more specifically to tools that are used to manually install retaining rings on shafts or in bores.

Retaining rings are widely used in many fields to retain working elements on either shafts or within cylinder bores. Retaining rings are used on cylindrical shafts to create a removeable shoulder that retains a plurality of working elements assembled thereon. Such retaining rings may be seated in a groove formed in the shaft, or they may grip the shaft in locations adjacent the working elements. Retaining rings may also be used to create a removeable shoulder within a bore that retains a plurality of working elements in place within the bore. In such instances, the retaining rings may be either seated in an inner, annular groove within the bore, or they may grip the bore adjacent the working elements.

Retaining rings are commonly applied to shafts or in bores by the use of machines. The prior art is filled with examples of such machines. U.S. Pat. No. 4,953,276, issued Sep. 4, 1990 describes an apparatus that is used to insert valve seats into hollow bodies. A valve seat mounting head includes a plurality of individual spring fingers that extend from a mounting head body and are used to grip the exterior of the valve seat. The mounting head (body is drawn rearwardly so as to pull the valve seat into an opening in a valve boy. This requires the use of a double-acting piston, which is complicated and expensive.

A ring installation tool is also described in U.S. Pat. No. 4,610,834, issued Sep. 9, 1986. This tool has a round handle end and an elongated, insertion end that is slotted to define four distinct quadrants of the insertion end. These quadrants are defined by the slots which also define deflectable arms, or fingers. Because the insertion end must be inserted into a bore of a diameter smaller than that of the ring in order to seat the ring, it must be made of a material with a certain amount of deforming "give", such as plastic or hard rubber, and will not be able to be used for the installation of rings that require a large amount of insertion force. Such a tool further requires the use of a separate sleeve liner that unduly complicates the use of the tool.

U.S. Pat. No. 2,422,549, issued Jun. 17, 1947 describes an assembling tool for applying a waved retaining ring to an insert in a panel aperture. The tool includes a tapered mandrel that increases from a first diameter to a second diameter. The first diameter is less than the diameter of the retaining ring and the second diameter is greater than the diameter of the ring and the panel insert. In order to advance the retaining ring along the mandrel, a tubular member is provided that has an inner diameter that is slightly larger than the second diameter of the mandrel. This tubular member includes a handle and a hollow body that includes an elongated sleeve at its insertion end and the sleeve has a plurality of slotted fingers formed with it. These fingers lie within the interior of the tubular member, proximate its sidewall and they all have a common recess formed at their free ends which grip the retaining ring and hold it in place within the tubular member. The fingers expand outwardly against the tubular member sidewall as they slide radially down the mandrel. Care must be taken not to tilt the tubular member during application of the ring so that the application force is not inadvertently increased.

All of these prior art devices are complicated assemblies formed from a plurality of pieces and have a structure where the force required to apply the ring to a shaft or a bore is great.

The present invention is directed to a retaining ring installation tool that is simple in design, has few components, is inexpensive to manufacture and may be used in the installation of retaining rings on either shafts or in bores.

SUMMARY OF THE INVENTION

Accordingly, it is a general object of the present invention to provide a retaining ring installation tool that is used for the manual installation of metal retaining rings and which is formed from a single piece of metal and which possesses the necessary flexibility and strength to engage and install retaining rings.

Another object of the present invention is to provide a retaining ring installation tool for the use in manual installation of retaining rings on shafts and in bores and which includes an elongated member having opposite driving and insertion ends, the driving end being substantially solid to provide a reaction surface for and to facilitate the driving of a retaining ring on a shaft or into a bore, the insertion end being hollow and slotted to define a plurality of spring fingers that bear against a retaining ring and which are deflectable and which possess hardness not to break during operation and sufficient tensile strength to either expand over a shaft or to contract within a bore and then return to their original operating position.

A still further object of the present invention is to provide the insertion end spring fingers with enlarged free ends having a size and thickness that is greater than that of the spring fingers so as to ensure substantially complete contact against the retaining ring during installation.

Yet still another object of the present invention is to provide a retaining ring installation tool that is particularly suitable for manual installation of retaining rings onto shafts or into bores, the tool being formed from a single piece of metal, without any additional parts, the tool including a solid driving end to which is applied a force during use of the tool, and an application end which abuts against a retaining ring and which drives the retaining ring axially along a shaft or in a bore, the tool further including a hollow body extending lengthwise of the tool, the hollow body having a series of longitudinal slots formed therein which define a plurality of deflectable spring fingers with an elastic memory extending lengthwise from the driving end to the application end, the spring fingers having a collective diameter at the application end of the tool that is either less than a diameter of the tool where the spring fingers extend from the solid driving portion for use in installing retaining rings onto shafts or greater than a diameter of the tool where the spring fingers extend from the solid driving portion for use in installing retaining rings into bores or housings.

Still yet another object of the present invention is to provide a retaining ring installation tool for use in manually installing retaining rings onto shafts and in bores, the tool being capable of manual use without the need for excessive force being applied thereto, the tool being formed from a cylindrical metal blank and having a substantially solid rear, driving end with a reaction face for applying a ring application driving force thereto, and the tool having a tapered body that extends lengthwise of the tool from the rear driving end to a forward, application end, the tapered body including a plurality of spring fingers formed by cutting slots in the tapered body, the spring fingers being integrally joined to the tool driving end and having free ends that are collectively concentrically bent so as to define an outer diameter of the free ends that is less than a corresponding inner diameter of the driving end.

Still another object of the present invention is to provide a manual installation tool for retaining rings that utilizes a plurality of deflectable, slotted spring fingers that deflect inwardly or outwardly during installation and which have the same wall thickness to equalize the installation force encountered with use of the tool, the free ends of the spring fingers having enlarged end portions that have ring-contacting surfaces arranged thereon which extend generally perpendicularly to the longitudinal axis of the tool, the enlarged end portions having a height that exceeds the width of the retaining ring which the tool is used to install, thereby ensuring complete contact between the tool and the retaining ring.

Yet another object of the present invention is to provide a retaining ring installation tool having a base portion and an application portion defined by a plurality of individual spring arms that extend forwardly from the base portion and which are arranged in a circular pattern, each of the spring arms have an enlarged application face that remains in contact with either a shaft or a bore as the spring arms contact a retaining ring and advance along and wherein the spring arms move radially inwardly to a diameter equal to that of an inner diameter of the retaining ring upon which the tool is used.

Yet still another object of the present invention is to provide a retaining ring installation tool having a cylindrical hollow body, the body having a solid base and a plurality of distinct elongated spring arms that extend longitudinally from the base, the spring arms terminating in enlarged free ends that maintain contact with the retaining ring and the shaft or bore during installation, the spring arms being cooperatively defined by an internal cavity of the body that terminates at a location rearwardly of the location at which the spring arms extend from the base so as to reduce stress concentrations in the tool where the spring arms extend from the base.

These and other objects and advantages of the present invention are accomplished by way of the invention's unique structure.

In one principal aspect of the invention and in accordance with a first embodiment thereof, the present invention utilizes a solid piece of cylindrical metal stock to form the tool. The stock piece has an initial outer diameter and is bored to a desired inner diameter to create a hollow cavity that will receive a shaft therein when the tool is used for installation of a retaining ring on a shaft. The cavity begins at what is referred to as an insertion, or application, end of the tool, and it extends inwardly for a length that is less than the length of the stock piece. The difference in length defines a solid rear, or driving end of the tool to which is applied an installation force during use. This driving end may be tapped for threading onto a rod or the like.

The body of the tool is then machined down on its exterior surface to define an exterior annular recess having a length that is less than the length of the hollow cavity and which is also less than the overall length of the tool. This length is positioned intermediate the two ends of the tool so that a sidewall is formed surrounding the internal cavity and the sidewall preferably has a constant wall thickness between the driving and the application ends of the tool. The tool is slotted at circumferential intervals at preselected intervals to define a plurality of installation fingers that extend lengthwise from the driving end and which terminate at the application end of the tool.

The constant wall thickness extends along the body of the tool and assists in ensuring that a uniform application force is applied to the ring by the tool during installation. It also assists in providing the optimum installation force for manual use of the tool. In order to assure complete contact with the ring, the free ends of the spring fingers are increased in size to a diameter that is greater than the outer diameter of the body of the tool and which is slightly larger than the outer diameter of the rings which are used with the tool. These enlarged ends maintain contact with both the retaining ring and either the inner diameter of a bore or the outer diameter of a shaft during all steps of installation of the ring. Due to the forces encountered by the tool during use, the internal cavity terminates rearwardly of the point at which the spring fingers extend from the body. This ensures that there is an adequate amount of body material concentrated at the junction of the spring fingers to the body in order to reduce or eliminate stress concentrations at the junction.

In another embodiment of the invention, the free ends of the spring fingers are not enlarged, but are common with the outer diameter of the body of the tool so that the spring fingers have a constant wall thickness for their entire length. The thickness of the fingers are based on the diameter of the shafts for which the tool is used in order not to be adversely affected by the axial force encountered by an installer using the tool. Preferably, the tool is made from a metal having an ultimate tensile strength of 150,000 psi (pounds/square inch) or greater having a "memory", which permits its spring fingers to expand outwardly or contract inwardly during use and returning to their original installation positions without any permanent deflection occurring in the spring fingers.

The installation tool is formed from a single piece of metal so as to maintain the simplicity of its design and to keep its cost of manufacture low. The unitary structure of the tool permits the insertion spring fingers to be made in a uniform thickness so to ensure that each such spring finger encounters approximately the same installation force during use. The insertion spring fingers may also be more easily bent into a smaller diameter so they initially may engage a tapered installation plug and extend therealong into reliable contact with the retaining ring. In instances where the installation tool is used to insert a retaining ring into a bore, the insertion spring fingers may be bent outwardly into a larger diameter so that the spring fingers, especially the engagement ends thereof may engage a tapered sleeve and extend therealong into reliable contact with the retaining ring.

These and other objects, features and advantages of the present invention will be clearly understood through a consideration of the following detailed description.

DETAILED DESCRIPTION OF THE PREFERRED EMBODIMENTS

As mentioned above, retaining rings are used to retain work elements on shafts or in bores. Retaining rings may be formed from square edge, flat wire stock that is edge wound around a form or mandrel, to obtain a specific diameter or they may be stamped from sheet or strip metal in the form of a circlip. Spiral retaining rings are usually formed into a single turn or into multiple turns of flat wire. For a single turn retaining ring, a gap exists between the free ends of the flat wire, and the total circumferential extent of the flat wire extent from which the ring is made does not exceed about 360 degrees. In a two-turn ring, the flat wire stock is wound around a mandrel twice so that it has a circumferential extent that equals or is slightly less than two winds of 360 degrees each.

Multiple-turn retaining rings may be assembled onto or into their supporting components in two manners. In manual assembly, one end of the flat wire is first separated and then inserted into the ring retaining groove. The ring is then wound into the groove until the other free end snaps into place in the groove. The ring is then inspected to ensure that it is properly seated in the retaining groove. This type of manual assembly is slow, tedious and labor-intensive. The other means of assembly involves using a simple tool or assembly fixture.

Figures 1A, 1B, 1C, 1D, 2A, 2B, 2C, 2D:
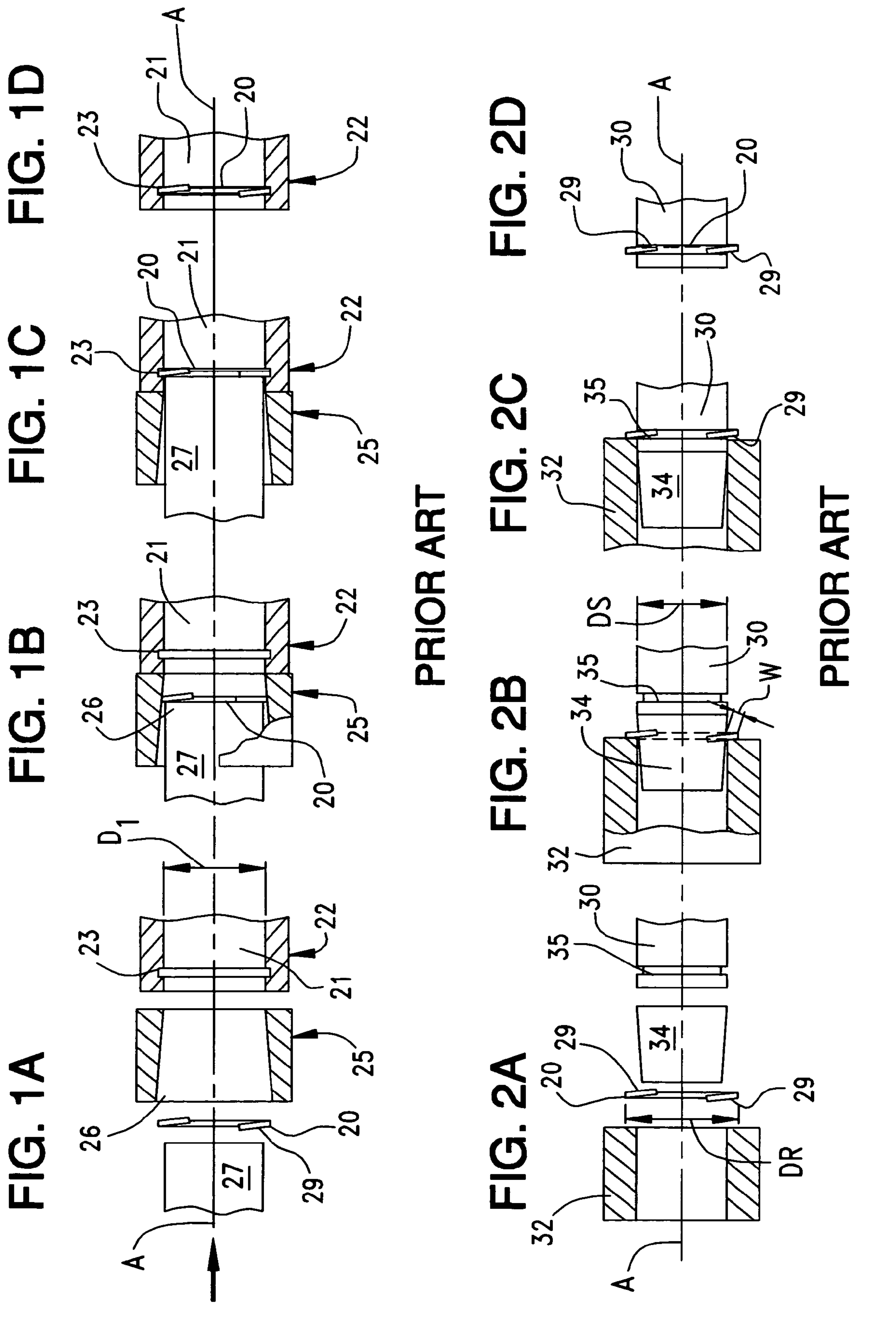
FIG. 1D PRIOR ART
FIG. 2D PRIOR ART
FIGS. 1A–1D are sequential schematic views illustrating a known manner of installation of a retaining ring into a bore.
FIGS. 2A–2D are sequential schematic views illustrating a known manner of installation of a retaining ring onto a shaft.

FIGS. 1A–2D illustrate currently known manners of applying retaining rings to shafts or bores using the simple tools described above. In FIG. 1A, the components that are commonly used to apply a retaining ring 20 into a bore 21 formed within a body, or housing 22 are shown. The bore 21 has an inner diameter $D_1$ and an annular groove 23 formed therein having a diameter that is greater than the bore inner diameter, $D_1$ so it may receive an expandable retaining ring 20. A simple installation aid, such as a tapered sleeve 25 is provided with a tapered cavity 26 that has a diameter that tapers down from the ring free outer diameter DR to the bore diameter, $D_1$. A plunger 27 is used to push the retaining ring into the sleeve cavity 26. The retaining ring is formed by winding a piece of flat stock into a circle with two free ends, so that it is free to expand or contract under pressure of the plunger 27. As the plunger 27 moves forward (or to the right in FIG. 1A) the free ends of the retaining ring 20 grow closer and the diameter of the ring 20 changes. The diameter of the retaining ring 20 will either increase or decrease depending on the type of installation, i.e., it will increase when driven along a plug and then onto a shaft, or it will decrease when driven within a sleeve into a bore 21.

In FIG. 1B, the ring 20 has been reduced in diameter as it has traveled about halfway through the tapered, hollow installation sleeve 25. In FIG. 1C, the ring has been decreased in diameter enough to permit it to be finally pushed by the plunger 27 into the bore 21 of the housing 22. Continued movement by the plunger 27 will result in the ring 20 being seated in the bore's ring groove 23 as shown in FIG. 1D.

A similar process is used to install a retaining ring 20 onto a shaft 30. This time, a hollow plunger 32 is used in combination with a solid, tapered plug 34 that has an increasing diameter that increases up to or slightly greater than the shaft diameter DS. The hollow plunger is needed to clear the plug 34 as the ring 20 is advanced toward the ring groove 35. The ring 20 is placed onto the plug and the plunger 32 is brought into contact with it as shown in FIG. 2B. As the plunger 32 moves forward, it causes the ring diameter to expand until it reaches a larger diameter that approximates that of the shaft diameter, DS. The free ends 29 of the ring 20 permit such circumferential expansion as shown in FIG. 2C. Continued movement of the plunger results in the ring 20 being seated in the annular groove 35 formed on the shaft 30.

Figure 3:
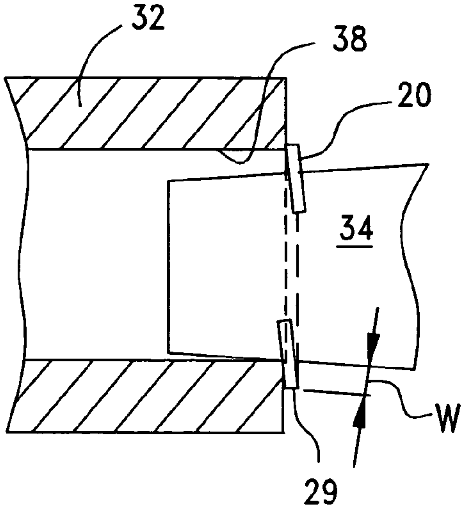
FIG. 3 is an enlarged detail view of one of the view of FIGS. 2A–2D showing the gap which occurs between the retaining ring and the hollow plunger used therewith for installation.

Problems arise in this manner of installation with the contact that occurs between the plunger exterior surface or the sleeve interior surface and the retaining ring. In the industry, the plug and sleeve are tapered at about a 6 degree angle, for too large an angle greatly increases the force required to easily move the ring onto and along the shaft. When using a hollow plunger, as is illustrated in FIGS. 2A–2D, the large end diameter of the plug dictates the needed inner diameter of the plunger, because the plunger must clear the plug and the shaft in order to advance the ring on to the installation plug. As the hollow plunger moves the ring down the plug, the inside diameter of the retaining ring grows, and increases to an extent where it can move off the plug and onto the shaft. When the ring is close to the large end of the plug 34, the inner diameter of the hollow plunger 32 is just slightly larger that the inner diameter of the retaining ring 20. This is illustrated best in FIG. 3.

In the initial stage of installation, with the retaining ring at the small end of the installation plug, there is a possibility that the hollow plunger 32 may lose its concentricity with the shaft, i.e., deviate from being parallel with a central axis shown by line A—A in the Figures. Where the hollow plunger deviates from this alignment, the possibility exists that the gap between the outer surface of the plug 34 and the inner edge 38 of the plunger 32 may be momentarily as large as the ring's outer diameter and cause the ring 20 to enter the hollow plunger 32 and bind with the plug 34 and the plunger 32. This binding is caused by the plunger 32 losing contact with the retaining ring 20 and could lead to breaking of any of the installation components or to injury to the installer. This is illustrated best in FIG. 3. It is desirable to maintain contact with the retaining ring throughout its installation in order to either even out or lessen the force required to install the retaining ring 20.

Figure 10:
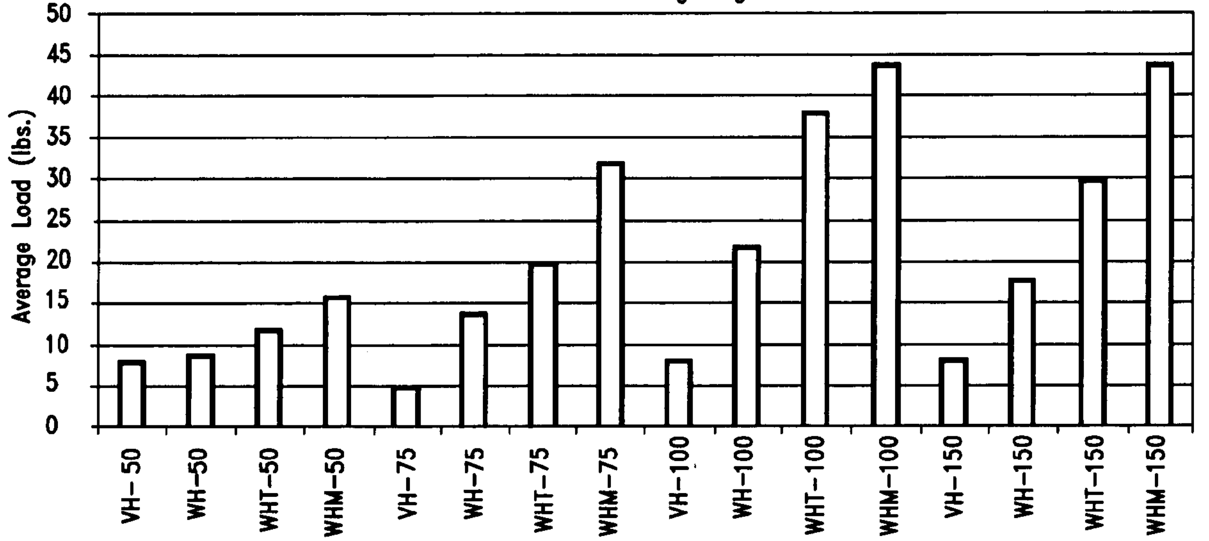
FIG. 10 is a table illustrating the force required to install one- and two-turn retaining rings within various sized bores; and, FIG. 11 is a table illustrating the force required to install one- and two-turn retaining rings onto various sized shafts.

As the retaining ring 20 moves along the plug 34, it needs to expand circumferentially and as the ring 20 moves through an installation sleeve 25, it needs to contract circumferentially. Thus, it can be considered that two different forces are encountered in installation of such rings. The first force is the frictional force that the ring encounters in its movement along the plug 34 or in the plunger sleeve 25. (FIGS 1B & 2B). The second force is the force required to expand or contract the ring circumferentially. These two forces must be overcome by the axial force that is required to install the ring. The axial force is also related to the degree of taper of the plug/sleeve. A range of between 5 and 6 degrees is used as a taper of the plug or the sleeve. Results of testing of different style rings are presented in FIGS. 10 & 11. In FIG. 10, a series of Smalley Steel Ring Company one- and two-turn retaining rings are listed, with their diameters ranging from between approximately about 0.5 inches to about approximately 1.5 inches. The rings indicated in the first column with a "V" in their part number are 1-turn retaining rings, while those rings with a "W" in their part number are 2-turn retaining rings. These part numbers further indicate that the rings are used internally in a bore by the "H" designation in their respective part numbers.

Figure 11:
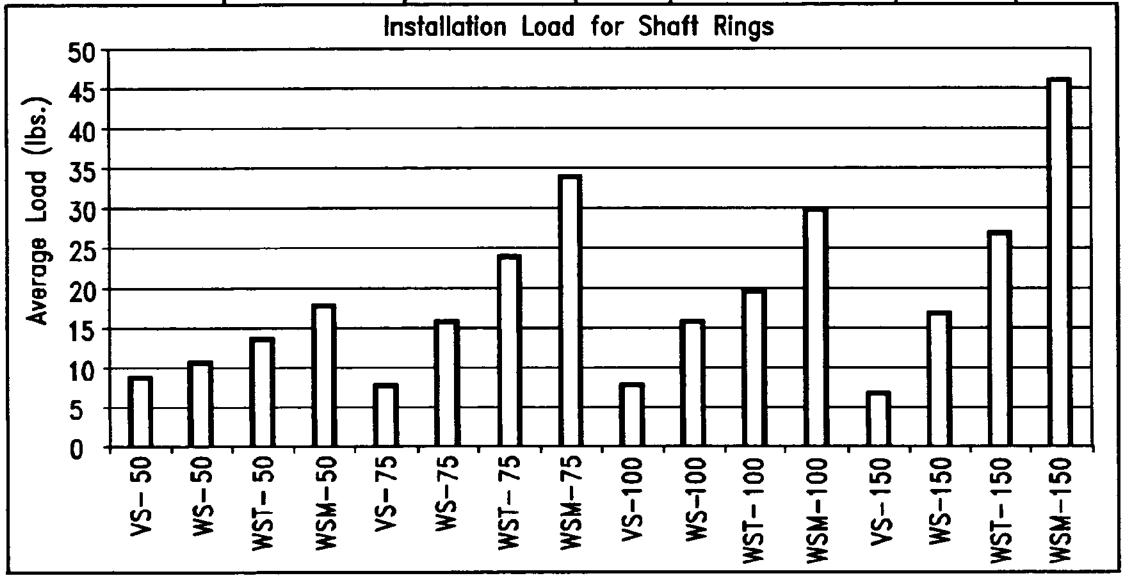

FIG. 11 is a similar table, but one which illustrates the force required to install one- and two-turn retaining rings onto shafts of various sizes. The part numbers in this table that use a "V" are one-turn rings, while those that have a "W" are two-turn retaining rings. These part numbers further indicate that the rings are used externally on a shaft by the "S" designation in their respective part numbers. These tables demonstrate that the installation force required increases both as the diameter of the shaft/bore increase, as well as the number of turns in the retaining ring. It can be seen that the average installation load force for an internal installation in a bore increases from 8 lbs for a single turn ½-inch to 12 lbs for a two-turn ring in the same size bore, an approximate 50% increase. Similarly, it takes approximately 8 lbs of force to install a 1-½ inch diameter single-turn ring in a similar bore, and 44 lbs of force for a heavy-duty two turn 1-½-inch diameter ring in a bore, an approximate 450% increase.

This demonstrates that a retaining ring installation tool needs to have the ability to apply various installation forces, namely forces that vary from a base line amount, i.e., 8 lbs of force, to about a fivefold force increase, i.e., 44 lbs and that such a tool needs to handle such loads without detrimental stress concentrations occurring in the tool. It is believed that the installation tools described in the prior art above, with their multi-piece construction and their overall structure would not be able to manually exert such a wide range of forces onto retaining rings. The present invention is directed to such an installation tool.

Figure 4:
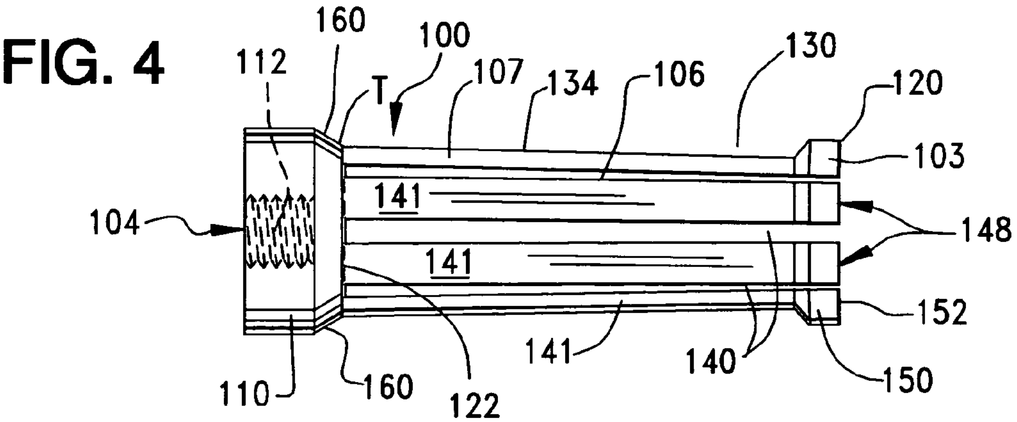
FIG. 4 is an elevational view of a first embodiment of a retaining ring installation tool constructed in accordance with the principles of the present invention.
Figure 5:
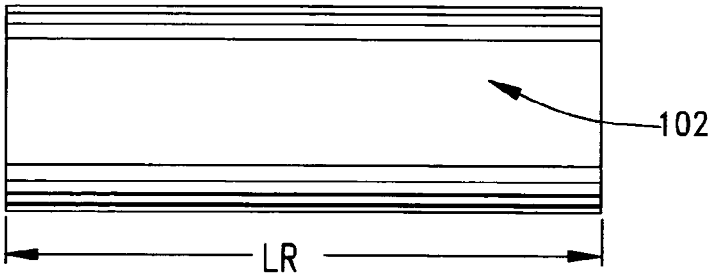
FIG. 5 is a side elevational view of a piece of cylindrical bar stock from which the installation tool of FIG. 4 is formed.

FIG. 4 illustrates one embodiment of a retaining ring installation tool 100 constructed in accordance with the principles of the present invention. The tool 100 is preferably formed as a single piece from a solid cylindrical, elongated extent of rod or bar stock 102. (FIG. 5.) The tool 100 has two opposing ends 103, 104 which will be referred to herein as a tool insertion end 103 and a tool driving end 104.

The insertion end 103 is used to insert a retaining ring 20 onto either a shaft 30 or into a bore 21, and is intended to contact the retaining ring 20, while the driving end 104 provides a means by which the user may apply a driving, or pushing force on the end 104 of the tool 100 and onto the ring 20. The structure of the tool 100 is best described in terms of the manner of its construction.

Figure 6:
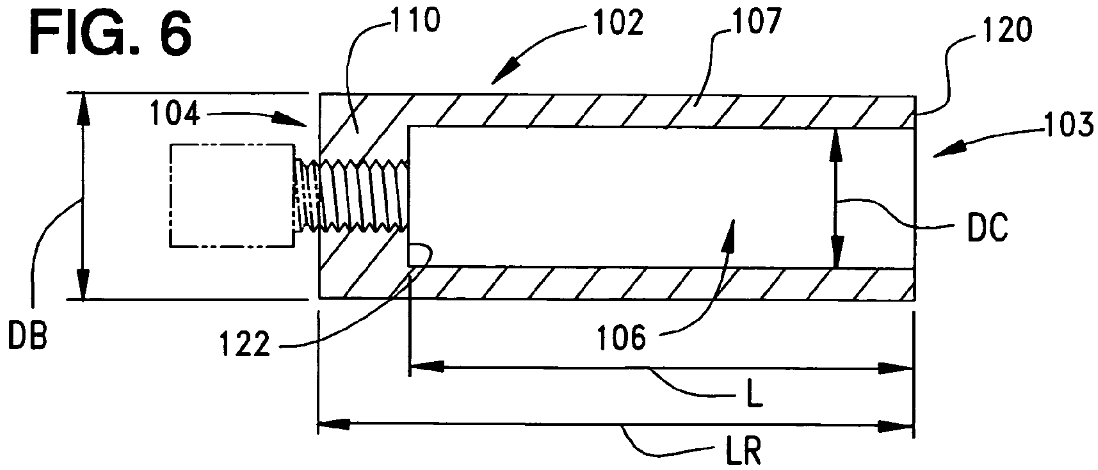
FIG. 6 is a sectional view of the stock piece of FIG. 5 illustrating the extent of the hollow cavity that is formed in the installation tool of FIG. 4.
Figure 7:
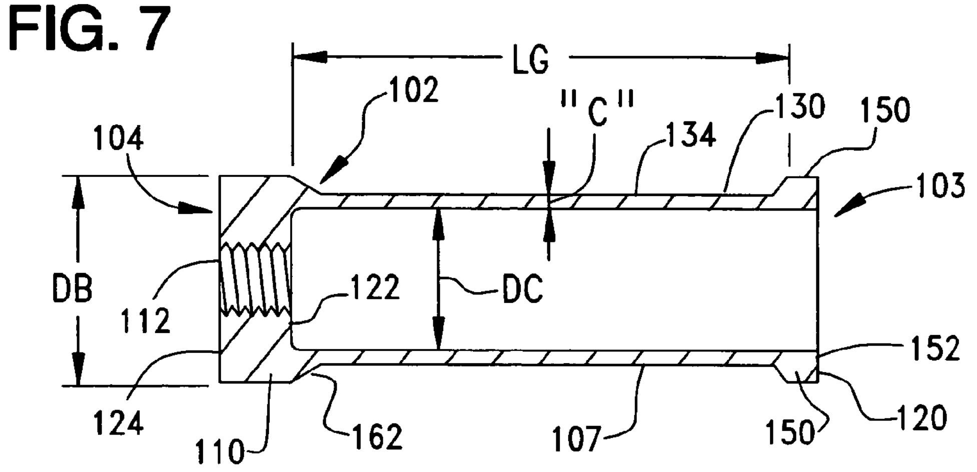
FIG. 7 is the same view as FIG. 6, but illustrating how the body of the installation tool of FIG. 4 is formed, along with the enlarged installation end.

After the rod stock 102 is chosen and measured and cut to a specific length, the stock piece 102 is machined by suitable means at the leading edge 120 of the insertion end 103 in order to form a hollow cavity 106 that is defined by a surrounding sidewall 107 of the tool. The internal cavity 106 extends rearwardly from the insertion end leading edge 120 into the rod stock for a predetermined length L. (FIG. 6.) This length L preferably at least slightly exceeds the installation length required, which may be considered as the length from the leading edge of a tooling plug 34 shown in FIG. 1 to the shaft's ring retention groove or from the leading edge of a bore to the bore's ring retention groove. When first machined, the cavity 106 has a given inner diameter DC (FIG. 6) that exceeds the diameter of the plug and shaft upon which the tool will be used, so that the cavity 106 may fully accommodate the plug 34 and shaft 30 therein.

Figure 9A:
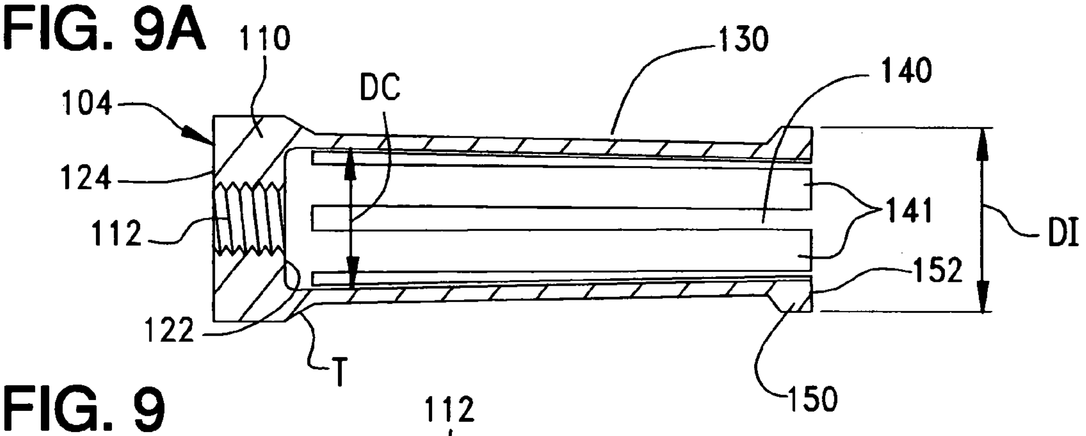
FIG. 9A is the same view as FIG. 8, but with the application end of the tool compressed down to a preselected outer diameter.
Figure 9:
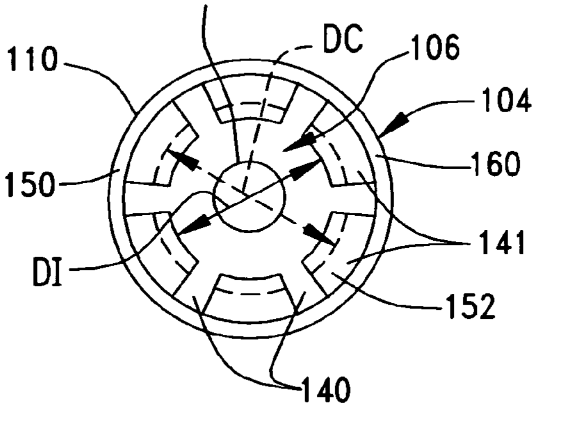
FIG. 9 is a front end view of the application tool of FIG. 4.

The difference between the total length LR of the rod stock 102 and the length L of the cavity 106 defines a solid body portion 110 at the rear of the tool 100 that extends from the trailing edge 122 of the cavity 106 to the driving end 104 of the tool. This solid body portion 110 has a rear reaction surface 124 to which force may be applied to drive the tool during its installation work. Such a force may be applied by hand or by way of another tool such as a mallet or the like. The body portion 110 may include a threaded hole 112 that is formed within a central portion thereof for receiving a threaded rod of the like. The body portion 110 has a preselected diameter DB which is larger than the diameter DC of the internal cavity 106 and which is preferably larger than the diameter of the insertion end DI (which is the outer diameter of the installation end) after the free ends of the contact arms 141 are bent permanently inwardly, as for a tool used for installing retaining rings upon shafts. (FIG. 9A.)

An annular recess 130 (FIG. 8) may be formed in the exterior surface 134 of the rod stock 102 along the length L of internal cavity 106 so that a portion of the material of the body portion is removed therefrom. This results in the formation of an annular sidewall 107 that surrounds the internal cavity 106. The recess 130 has a length LG that is less than the overall length of the tool and which is also preferably less than the length L of the internal cavity 106. By this process, the sidewall 107 is integrally formed with the solid end portion 110 of the tool body. A sidewall thickness C is desired that gives the tool 100 desired flexibility, but which maintains a structurally sound transition between the tool solid end 110 and the sidewall 107. This transition is shown in the drawings at "T". The formation of the recess 130 preferably results in a uniform sidewall thickness, so that installation forces are transmitted equally through the sidewall and the contact arms 141 formed therein, as explained below.

The sidewall of the tool is then machined to define a plurality of longitudinal elongated slots 140 that extend lengthwise along the tool. These slots 140 define a plurality of elongated, cantilevered contact arms 141 between adjacent slots 140 and which are spaced apart from each other circumferentially along the sidewall 107 of the tool body. The contact arms 141 extend lengthwise of the tool body and are integrally formed with the solid portion 110 and extend to the tool insertion end 103. This integral formation results in an integral connection, or transition from the tool solid end 110 to the contact arms through which forces and stresses are transmitted, rather than through a joint or other type of connection, as is shown in the prior art.

The annular recess 130 does not extend to the insertion end of the tool 100 to thereby define enlarged end portions 150 at the free ends 148 of the contact arms 141. These enlarged end portions 150 support ring-contacting surfaces 152 that are designed to make contact with retaining rings 20 disposed on either a plug or in a bore as shown and described hereinabove. The ring-contacting surfaces 152 extend at an angle to the longitudinal axis of the tool 100, and preferably extend perpendicularly thereto. These ring-contacting surfaces 152 define a series of points that contact the side, or radial width W (FIG. 2B) of the retaining rings during installation. They are preferably symmetrically disposed circumferentially around the insertion end 103 of the tool 100 so that force exerted onto the rings by the contact arms will be equally distributed around the rings. These ring contacting surfaces 152 also preferably have a height H that is equal to or exceeds the radial width W (FIG. 2B) of the retaining ring 20. This prevents the ring from losing contact with the tool contact arms 141. The enlarged end portions also reduces any high stresses that would occur due to the relative thin, uniform thickness of the contact arms 141.

Figure 9B:
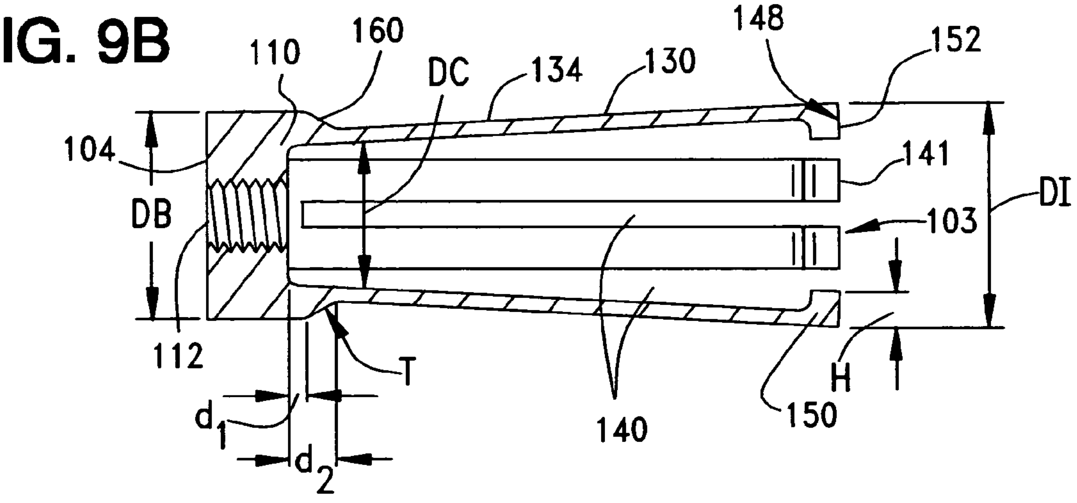
FIG. 9B is the same view as FIG. 8, but with the application end expanded out to a preselected outer diameter.

The free ends 148 of the contact arms 141 may be bent inwardly, preferably concentrically inwardly toward the longitudinal axis of the tool so that the diameter DI of the tool insertion end 103 is less than the diameter DC of the internal cavity 106. In this manner, the contact arms will ride up on the external surface of a plug 34 used to install a retaining ring 20 onto a shaft 30. Similarly, and as illustrated in FIG. 9B, the free engagement ends 148 of the contact arms may be bent outwardly and concentrically away from the longitudinal axis of the tool so that diameter DI of the tool insertion end 103 is greater than the diameter DC of the internal cavity 106. This facilitates the entry of the tool insertion end 103 into an installation sleeve 25 used to install a retaining ring 20 into a bore 21. This difference in diameter also permits the tool to be used with retaining rings of the smallest diameter suitable for use with the tool and then expandable to sizes 2–4 times larger. As mentioned above, it is preferable to have the tool made from a metal having an ultimate tensile strength of 150,000 psi or greater so that the spring fingers may mechanically act as leaf springs and expand over an installation plug or contract within an installation sleeve, but return to their original installation diameter, DI. With this property, the spring fingers possess a "memory" which enables them to return to their original installation diameter DI without any permanent deformation occurring therein.

Figure 8:
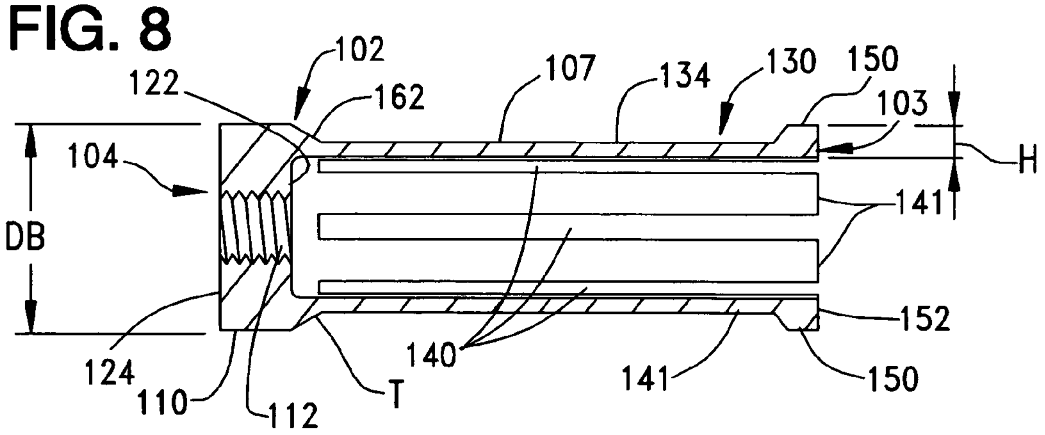
FIG. 8 is the same view as FIG. 7, but with the plurality of slots formed in the body portion of the tool.

As shown in the embodiment depicted in FIG. 4, the annular recess 130 preferably includes a ramped, or angled surface 160, rather than a flat notch at the transition T in FIG. 8. This angled surface 160 assists in reducing stress concentrations at the junction of the contact arms 141 as explained below. The rear wall (or trailing edge) 122 of the internal cavity 106 is preferably positioned rearwardly of the beginning of the angled surface 160 (at the location where the contact arms 141 join the solid body portion 110) and most preferably, rearwardly of the location where the angled surface 160 meets the outer surface of the solid body portion 110, as shown best in FIG. 9B. This separation distance "d" indicates the increase in the amount of material, i.e, the sidewall thickness, near the junction of the contact arms 141 to the solid body portion 110. Additionally, the rear location of the cavity end wall 110 away from the location where the angled surface 160 meets the contact arms 141 prevents what is known as a "stress riser" from occurring and increasing stress concentrations at the junction of the contact arms 141 and the solid body 110, as would occur if the rear wall 122 would be placed in line with the forward edge of the angled surface 160.

In operation, the tool insertion end 103 is inserted either into a sleeve or over the end of a plug and moved axially into contact with a retaining ring so that contact is maintained at all times during assembly, from the ring's free state until it reaches its maximum expanded or contracted diameter that is needed for installation. The tool is pushed forwardly and the contact arms flex outwardly on the plug or inwardly in the sleeve, while maintaining contact with the retaining ring. Forces applied to the solid end portion 110 are transmitted through the integral transitions T into the contact arms 141 and through the enlarged end portions thereof against the ring 20.

While the preferred embodiment of the invention have been shown and described, it will be apparent to those skilled in the art that changes and modifications may be made therein without departing from the spirit of the invention, the scope of which is defined by the appended claims.

I claim:

1. An installation tool for installing retaining rings on a shaft or in a bore, the shaft or bore having a given diameter, comprising:

an elongated body having a first preselected length that extends between first and second opposing ends of the body, the first end being a tool driving end and the second end being a tool installation end, said body including a hollow portion with a cavity formed therein which extends from the tool installation end rearwardly into said body, the hollow cavity extending axially within said body for a second preselected length, the second preselected length being less than the first preselected length, the difference of said first and second preselected lengths defining a solid portion of said body at said tool driving end that abuts said hollow cavity and which provides a surface by which to apply a force to said tool during operation thereof, said hollow cavity being surrounded by a sidewall of said body, the sidewall being integrally formed with said body solid portion;

a plurality of elongated slots formed in said sidewall and extending from said tool installation end rearwardly lengthwise along said body for said second preselected length, the slots defining a plurality of individual contact arms that extend in a cantilevered fashion, lengthwise from said solid portion, the contact arms being bent in a direction transverse to a central longitudinal axis of said body such that a diameter of said cavity varies in size between said tool installation end and said tool driving end, the slots varying in width lengthwise along said tool body, and, each of said contact arms having an enlarged free end for contacting a retaining ring, the contact arm enlarged ends each including a flat retaining ring-contacting face that extends at an angle to the central longitudinal axis of said tool.

2. The retaining ring installation tool of claim 1, wherein said contact arms are bent radially outwardly from said tool central longitudinal axis such that a diameter of said tool installation end is greater than a diameter of said tool driving end.

3. The retaining ring installation tool of claim 1, wherein said contact arms are bent radially inwardly toward said tool central longitudinal axis such that a diameter of said tool installation end is less than a diameter of said tool driving end.

4. The retaining ring installation tool of claim 1, wherein said contact arm flat retaining ring-contacting faces are perpendicular to said tool central axis.

5. The retaining ring installation tool of claim 1, wherein said contact arms have a thickness that is constant from said body solid portion and which increases at said contact arm enlarged ends.

6. The retaining ring installation tool of claim 1, wherein said contact arms are arranged in a symmetrical fashion around said tool central axis.

7. The retaining ring installation tool of claim 1, wherein said slots vary in width lengthwise along said tool body.

8. The retaining ring installation tool of claim 1, wherein said hollow cavity extends rearwardly of said slots so as to reduce stress concentration where said contact arms extend from said body solid portion.

9. The retaining ring installation tool of claim 1, further including an annular recess formed on the exterior of said tool body, and said hollow cavity extends rearwardly of said annular recess.

10. The retaining ring installation tool of claim 1, further including an annular recess formed on the exterior of said tool body, the annular recess defining an angled transition surface where said contact arms extend from said solid body portion, said hollow cavity extending rearwardly of said annular recess.

11. The retaining ring installation tool of claim 1, wherein said tool is made from a metal having an ultimate tensile strength of at least 150,000 (pounds/square inch).

12. A retaining ring installation tool for use in manually installing retaining rings onto shafts and in bores, the tool being capable of manual use without the need for excessive force being applied thereto, said tool comprising:

a cylindrical metal body portion having a preselected first length, a substantially solid driving end with a reaction surface for applying a ring application driving force to said tool, and an insertion end with a plurality of individual ring-contacting surfaces disposed thereon;

an internal cavity extending longitudinally within the body portion from the insertion end toward the solid driving end, the internal cavity having a second preselected length which is less than the first preselected length, said internal cavity defining an annular sidewall that surrounds said internal cavity, the annular sidewall being integrally formed with said solid driving end;

said sidewall including a plurality of longitudinal slots formed therein, the slots being circumferentially spaced around said sidewall to thereby define a plurality of contact arms that extend from in a cantilevered fashion from said solid end to said insertion end, the contact arms terminating in free ends, the ring-contacting surfaces being disposed on said free ends and extending at an angle to a longitudinal axis of said tool; and, an annular recess formed on an exterior surface of said body portion, the annular recess defining a uniform thickness of said contact arms in their extent from said solid driving end to said insertion end, one end of said annular recess being spaced apart from said contact arm free ends to thereby define a plurality of enlarged end portions of said contact arms, each of the enlarged end portions supporting a single ring-contacting surface thereon, and said annular recess having a third preselected length which is less than said first preselected length.

13. The installation tool of claim 12, wherein said internal cavity has a preselected diameter throughout its length.

14. The installation tool of claim 12, wherein said contact arm free ends are bent toward the tool longitudinal axis such that said internal cavity has a diameter that varies along its length, the internal cavity diameter proximate said tool solid driving end being larger than said internal cavity diameter proximate said tool insertion end.

15. The installation tool of claim 12, wherein said contact arm free ends are bent away from the tool longitudinal axis such that said internal cavity has a diameter that varies along its length, the internal cavity diameter proximate said tool solid driving end being larger than said internal cavity diameter proximate said tool insertion end.

16. The installation tool of claim 12, wherein the annular recess third preselected length is less than said second preselected length.

17. The installation tool of claim 16, wherein said solid driving end is tapered to meet said annular recess.

18. The installation tool of claim 12, wherein said tool is made from a metal having an ultimate tensile strength of at least 150,000 psi (pounds/square inch).

19. A retaining ring installation tool for use in manually installing retaining rings onto shafts and in bores, the tool being capable of manual use without the need for excessive force being applied thereto, said tool comprising:

a cylindrical metal body portion having a preselected first length, a substantially solid driving end with a reaction surface for applying a ring application driving force to said tool, and an insertion end with a plurality of individual ring-contacting surfaces disposed thereon;

an internal cavity extending longitudinally within the body portion from the insertion end toward the solid driving end, the internal cavity having a second preselected length which is less than the first preselected length, said internal cavity defining an annular sidewall that surrounds said internal cavity, the annular sidewall being integrally formed with said solid driving end;

said sidewall including a plurality of longitudinal slots formed therein, the slots being circumferentially spaced around said sidewall to thereby define a plurality of contact arms that extend from in a cantilevered fashion from said solid end to said insertion end, the contact arms terminating in free ends, the ring-contacting surfaces being disposed on said free ends and extending at an angle to a longitudinal axis of said tool, said contact arm free ends being bent toward the tool longitudinal axis such that said internal cavity has a diameter that varies along its length, the internal cavity diameter proximate said tool solid driving end being larger than said internal cavity diameter proximate said tool insertion end; and, an annular recess formed on an exterior surface of said body portion, the annular recess defining a uniform thickness of said contact arms in their extent from said solid driving end to said insertion end, one end of said annular recess being spaced apart from said contact arm free ends to thereby define a plurality of enlarged end portions of said contact arms, each of the enlarged end portions supporting a single ring-contacting surface thereon,.

20. A retaining ring installation tool for use in manually installing retaining rings onto shafts and in bores, the tool being capable of manual use without the need for excessive force being applied thereto, said tool comprising:

a cylindrical metal body portion having a preselected first length, a substantially solid driving end with a reaction surface for applying a ring application driving force to said tool, and an insertion end with a plurality of individual ring-contacting surfaces disposed thereon;

an internal cavity extending longitudinally within the body portion from the insertion end toward the solid driving end, the internal cavity having a second preselected length which is less than the first preselected length, said internal cavity defining an annular sidewall that surrounds said internal cavity, the annular sidewall being integrally formed with said solid driving end;

said sidewall including a plurality of longitudinal slots formed therein, the slots being circumferentially spaced around said sidewall to thereby define a plurality of contact arms that extend from in a cantilevered fashion from said solid end to said insertion end, the contact arms terminating in free ends, the ring-contacting surfaces being disposed on said free ends and extending at an angle to a longitudinal axis of said tool, said contact arm free ends being bent away from the tool longitudinal axis such that said internal cavity has a diameter that varies along its length, the internal cavity diameter proximate said tool solid driving end being larger than said internal cavity diameter proximate said tool insertion end; and, an annular recess formed on an exterior surface of said body portion, the annular recess defining a uniform thickness of said contact arms in their extent from said solid driving end to said insertion end, one end of said annular recess being spaced apart from said contact arm free ends to thereby define a plurality of enlarged end portions of said contact arms, each of the enlarged end portions supporting a single ring-contacting surface thereon.

* * * * *